United States Patent
Bacon et al.

(10) Patent No.: US 6,860,452 B2
(45) Date of Patent: Mar. 1, 2005

(54) AIRCRAFT FLIGHT SURFACE CONTROL SYSTEM

(75) Inventors: Peter William Bacon, Wolverhampton (GB); David Roy Tucker, Craven Arms (GB); Adam John McLoughlin, Burton-on-Trent (GB); David Coleman, Stratford-upon-Avon (GB)

(73) Assignee: Goodrich Actuation Systems Limited (GB)

( * ) Notice: Subject to any disclaimer, the term of this patent is extended or adjusted under 35 U.S.C. 154(b) by 0 days.

(21) Appl. No.: 10/288,902

(22) Filed: Nov. 6, 2002

(65) Prior Publication Data

US 2003/0127569 A1 Jul. 10, 2003

(30) Foreign Application Priority Data

Nov. 13, 2001 (GB) .............................. 0127254

(51) Int. Cl.[7] .............................................. B64C 13/36
(52) U.S. Cl. ............................. 244/194; 244/221; 701/4
(58) Field of Search ....................... 244/75 R, 194–197, 244/221; 701/4, 82; 91/464, 509; 318/564

(56) References Cited

U.S. PATENT DOCUMENTS

| | | | | |
|---|---|---|---|---|
| 4,327,437 A | * | 4/1982 | Gelderloos | 244/194 |
| 4,345,191 A | * | 8/1982 | Takats et al. | 244/194 |
| 4,422,180 A | * | 12/1983 | Wendt | 244/194 |
| 4,472,780 A | * | 9/1984 | Chenoweth et al. | 244/194 |
| 4,744,532 A | * | 5/1988 | Ziegler et al. | 244/75 R |
| 5,493,497 A | * | 2/1996 | Buus | 244/194 |
| 6,206,329 B1 | * | 3/2001 | Gautier et al. | 244/221 |
| 6,561,463 B1 | * | 5/2003 | Yount et al. | 244/196 |

FOREIGN PATENT DOCUMENTS

| | | |
|---|---|---|
| DE | 3906846 A1 | 9/1990 |
| EP | 0573106 A1 | 12/1993 |

* cited by examiner

*Primary Examiner*—Galen Barefoot
(74) *Attorney, Agent, or Firm*—Reising, Ethington, Barnes, Kisselle, P.C.

(57) ABSTRACT

A distributed control system is provided where the controllers are split into two dissimilar groups and flight control responsibility is further allocated within each group such that one entire group plus one further controller can fail without compromising the pilot's ability to fly the aircraft.

20 Claims, 13 Drawing Sheets

FIG. 2

Figure 1:
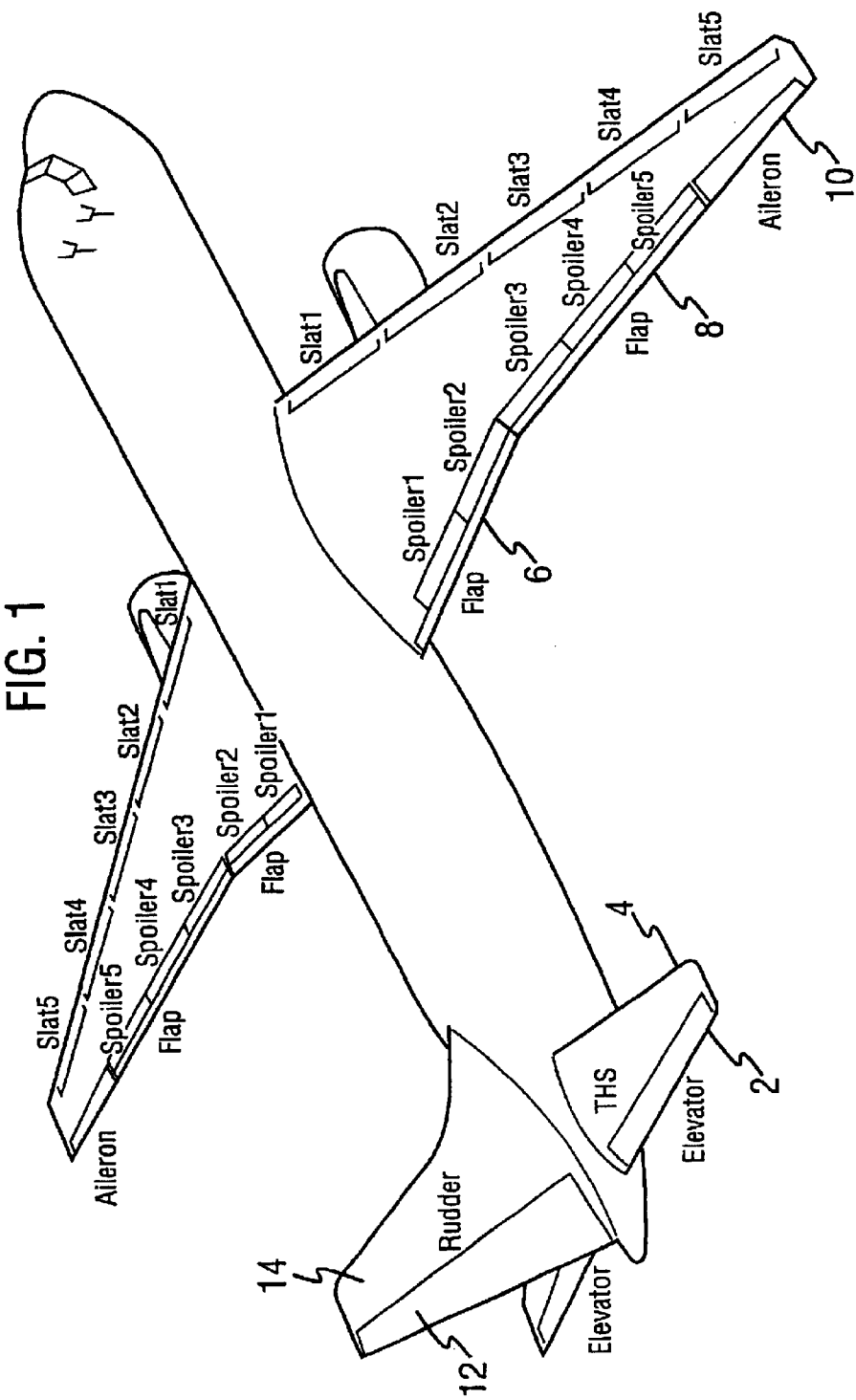

| A1 | A2 | A3 | B1 | B2 | B3 |
|---|---|---|---|---|---|
| DC Bus 1<br>DC Bus 2 | DC Bus 2<br>DC Bus 3 | DC Bus 3<br>DC Bus 1 | DC Bus 3<br>DC Bus 2 | DC Bus 1<br>DC Bus 3 | DC Bus 2<br>DC Bus 1 |
| Right Inboard Aileron<br>Hyd 1 | Left Inboard Aileron<br>Hyd 3 | Upper Rudder<br>Hyd 3 | Right Outboard Aileron<br>Hyd 3 | Left Outboard Aileron<br>Hyd 2 | Lower Rudder<br>Hyd 1 |
| Middle Rudder<br>Hyd 2 | Left Inboard Elevator<br>Hyd 2 | Right Inboard Elevator<br>Hyd 3 | Ground Spoiler<br>Hyd 3 | Left Outboard Elevator<br>Hyd 1 | Right Outboard Elevator<br>Hyd 2 |
| Spare | RH MFS #5<br>Hyd 2 | RH MFS #3<br>Hyd 2 | RH MFS #2<br>Hyd 1 | Spare | RH MFS #4<br>Hyd 1 |
| Spare | LH MFS #5<br>Hyd 2 | LH MFS #3<br>Hyd 2 | LH MFS #2<br>Hyd 1 | Spare | LH MFS #4<br>Hyd 1 |
| THSA | Flap | Slat | THSA | Flap | Slat |
| Analogue Backup Middle Rudder<br>Hyd 2 | Analogue Backup Left Hand Elevator<br>Hyd 2 | Analogue Backup Right Hand Elevator<br>Hyd 3 | Analogue Backup Right Hand Aileron<br>Hyd 3 | Analogue Backup Left Hand Aileron<br>Hyd 2 | Spare |

RVDT: Rotary Variable Differential Transformer

AIRCRAFT FLIGHT SURFACE CONTROL SYSTEM

The present invention relates to a control system for implementing full "fly-by-wire" control of an aircraft. In such a system there is no mechanically coupled backup to the electronic controller.

It is already known to build aircraft where all of the flight surfaces are controlled by an electrical flight control system which receives inputs from the pilot's controls. This move to computer controlled systems allows the computers to intervene, if necessary, in order to maintain the aircraft within a safe flight envelope. However, there has been a concern that such increasing sophistication also brings about a vulnerability due to the possibility of data processor failure. In order to overcome these problems, the use of multiple processors is known, as described in U.S. Pat. No. 4,744,532. Indeed, this document discloses that dissimilar computer architectures are required in order to ensure that the computers provided on the aircraft are unlikely to undergo a common mode failure.

The applicant has realised that even providing two sets of computers in dissimilar architectures is not necessarily sufficient in a high integrity system since one has to allow for the possibility that all of the computers will fail completely. Under such circumstances, it is still desirable to be able to control the aircraft.

A typical commercial jet liner normally has a plurality of control surfaces. For example, the aircraft shown in FIG. 1 has, on each side thereof an elevator 2, a trimmable horizontal stabiliser 4, a first flap 6, a second flap 8, an aileron 10, five spoilers labelled spoiler 1 to spoiler 5, and slats labelled slat 1 to slat 5. The aircraft also has a rudder 12 located along the centre line of the aircraft attached to the tail plane 14.

In use, different flight surfaces are involved in different jobs. Thus the roll control flight surfaces are the aileron 10 and spoilers 3 to 5 on each side of the aircraft. The pitch control surfaces are the elevator 2 and trimmable horizontal stabiliser 4. The yaw control surface is the rudder 14.

There are times during aircraft operation, typically during take-off and landing where high-lift is required of the wings. In order to achieve this, the slats 1 to 5 and the flaps 6 and 8 may be moved from their normal stowed position to high lift positions in order to obtain extra lift. Finally, all of the spoilers 1 to spoiler 5 may also be used as air brakes during landing of the aircraft. All of these flight control surfaces provide a high degree of control of the aircraft. However, not all of them are necessary for flight. Thus, should the pilot wish to control the pitch of the aircraft he would normally rely on operation of the left hand side and right hand side elevators 2 of the aircraft. However, pitch control of the aircraft can also be achieved through the use of one elevator 2 in combination with the trimmable horizontal stabiliser 4. Similarly, in order to control the roll of the aircraft the two ailerons are used, optionally in combination with the spoilers 3 to 5. However, roll control may also be implemented with one aileron in conjunction with one or more of the spoilers 3 to 5 on the opposing side of the aircraft. Pitch and roll control represents the minimum control requirements for continued safe flight and landing.

Finally, the rudder is used to control the yaw of the aircraft. Whilst this is desirable, it is not strictly necessary. Furthermore, the rudder is not required to turn the aircraft as the pilot can achieve this either by banking the aircraft or by varying the thrust levels from the engines on opposing sides of the aircraft.

According to the present invention, there is provided a flight surface control system for an aircraft the control system comprising first and second groups of controllers, the controllers arranged such that in the event of failure of the entirety of one of the groups of controllers and the failure of one further controller, the remaining operative controllers control sufficient ones of the flight surfaces to provide at least pitch and roll control, so as to provide continued safe flight and landing.

For a commercial passenger aircraft this means that any working pair of controllers in either one of the groups of controllers must be able to control pitch via the left hand side and right hand side elevators, or via one elevator and the trimmable horizontal stabiliser.

Furthermore any working pair of controllers in either one of the groups of controllers must be able to control roll via left hand side and right hand side ailerons or via one aileron and a spoiler, the spoiler being located on an opposing side of the aircraft.

Preferably the rudder is also controllable. However it is not a necessity for flight since the pilot can bank the aircraft in order to turn it in flight.

Preferably the remaining operative controllers are also able to control the high lift surfaces for control of an aircraft during take off or landing.

Preferably the first set of controllers are dissimilar to the second set of controllers so that they do not have a common mode failure path. This means dissimilar microprocessors, dissimilar memory, dissimilar programming and so on such that a failure mode in one set of controllers is not repeated in the other set of controllers.

For convenience the controllers may be regarded as an "A" channel and a "B" channel. In an embodiment of the present invention there are three controllers in each channel so that they can conveniently be labelled A1, A2, A3, B1, B2 and B3.

In the worst case operational scenario of only one set of controllers working for example, the A channel is working (because the other B channel had suffered a common mode failure) and one further controller failing, then it can be seen that the following pairs of controllers may remain.

A1 and A2
A1 and A3
A2 and A3

The inventor has realised that, in an arrangement in which the essential flight control surfaces are controlled by an arrangement having redundancy in the actuator system, certain design objectives can be used to derive a suitable system architecture.

Thus, since there are preferably at least four aileron actuators (left inboard, left outboard, right inboard and right outboard) provided on the aircraft it can be seen that no more than one aileron actuator should be driven from any controller. Furthermore no more than two actuators should be driven from any one channel.

Multifunction spoilers can be used to backup the ailerons and hence can usefully be distributed amongst those controllers not involved in aileron control.

Preferably there are also at least four elevator actuators so no more than one of these should be driven from any single controller. Furthermore no more than two actuators should be driven from any one channel.

The trimmable horizontal stabiliser acts as a backup to the elevators and therefore control of this should be distributed amongst the other controllers not already controlling elevators.

Preferably there are three actuators provided on the rudder. Therefore there should be no more than one actuator controlled by any single controller. Furthermore, no more than two actuators should be controlled from any one channel.

In an embodiment of the present invention the flight controllers have functions distributed between them such that:

A1 controls an aileron on a first side of the aircraft, one rudder actuator and a trimmable horizontal stabiliser.
A2 controls an aileron on a second side of the aircraft and one of the elevators.
A3 controls another one of the rudder actuators, the other one of the elevators and a spoiler pair.

Preferably controller A2 also controls one multifunction spoiler pair. The spoilers are arranged in pairs, with one of the spoilers of the pair being on one side of the aircraft and the other spoiler of the pair being on the other side of the aircraft. Although the spoilers are grouped into pairs, the spoilers in a pair do not have to move in unison. Thus, if need be, one of the spoilers can be held still whilst the other acts with the ailerons to control roll, or both spoilers may move.

Thus if controller pair A1 and A2 are the only active controllers the pilot has rudder control, both ailerons, one multifunctional spoiler pair and one elevator in conjunction with the trimmable horizontal stabiliser. This is sufficient to give him full control for pitch, roll and yaw.

If only controller pair A1 and A3 are active then the pilot has rudder control, both elevators, one aileron and one multifunctional spoiler pair. This is sufficient for flight control.

If only controller pair A2 and A3 are operational then the pilot has rudder control, both elevators an aileron and one multifunctional spoiler pair. This is sufficient for flight control.

The "B" set of controllers may be similarly arranged. However, they may only need to implement one rudder controller.

Thus the controllers may be arranged as follows:

B1 controls an aileron on the first side of the aircraft, and the trimmable horizontal stabiliser.
B2 controls the aileron on the second side of the aircraft and one of the elevators.
B3 controls the other elevator and a rudder actuator and a spoiler pair.

Preferably controller B1 controls one multi function spoiler pair.

The controllers advantageously receive electrical power from at least two electrical busses. In a preferred embodiment three busses are used and each controller is connected to two of the busses. The connections are permutated so that no two controllers in a single set receive power from the same two busses.

Furthermore it is advantageous that controllers in the "B" channel who's functions are similar to those of the equivalent or similar controller in the "A" channel are connected to receive power via the other bus.

Thus if A1 is connected to a first power bus, Bus 1, and to a second power bus, Bus 2, then B1 is connected to a third power bus, Bus 3, and also to one of the busses Bus 1 and Bus 2, for example Bus 2.

Following on from this, A2 is connected, for example, to Bus 2 and Bus 3. Thus B2 is connected to Bus 1 and also, for example, Bus 3.

Following this reasoning again, controller A3 is connected to Bus 1 and to Bus 3, and controller is connected to Bus 2 and also, for example, Bus 1.

Thus, provided all the controllers are otherwise functional, failure of any two out of the three power supply busses leaves all the flight surfaces fully controlled.

Also, the failure of either channel and one electrical bus also results in a controllable aircraft.

Preferably there are at least three hydraulic systems.

There are three rudder actuators and hence it is preferred that each should be on a different one of the hydraulic supplies.

Similarly pairs of essential flight control surfaces on opposing sides of the aircraft are connected to different hydraulic supplies.

Advantageously some of the flight control surfaces are controlled by two or more hydraulic actuators, as has hereinbefore been described with respect to the rudder.

The actuators are of a type where they are operable in an active mode, in which the actuator supplies motive power or force to control the position of the flight surface, and a standby mode in which the actuators can be back-driven.

In such an arrangement the left hand side aileron, for example, can be controlled by first and second hydraulic actuators. These will be referred to as "inboard" and "outboard" actuators with the "outboard" actuator being the one further away from the longitudinal axis of the aircraft.

Similar dual inboard and outboard actuators arrangements are found on the right hand side aileron and on the left hand and right hand side elevators.

Thus, in an embodiment of the system different controllers may control different actuators operating on the same flight surface. Preferably, each controller is provided with data concerning the load acting on the actuator and uses this to implement a "force fight" reduction algorithm. This prevents the controllers from fighting against each other.

Thus, working on the general configuration described hereinbefore, controller A1 only, for example, controls the inboard actuator for the right hand side aileron whereas controller B1 controls the outboard actuator for the same (right hand side) aileron. The inboard actuator may be on the first hydraulic supply whereas the outboard actuator is on a different hydraulic supply, for example, the third hydraulic supply.

Similar splitting of surface control tasks between different actuators on different hydraulic supplies for a given surface is used for other ones of the flight control surfaces.

Preferably analogue controllers for controlling the flight surfaces are also provided so as to provide a further level of backup in the unlikely event of failure of digital systems.

The analogue controllers may be implemented as an adjunct to the various digital controllers such that they derive their power from the various busses that supply the associated digital controllers.

In use, if a controller of one of the "A" or "B" channels fails, the corresponding device in the other set of controllers becomes solely responsible for or bears an increased level of responsibility for controlling the relevant flight surface.

It is thus possible to provide a highly fault tolerant distributed flight control surface. In the digital side of the system, two-thirds of the system could fail and acceptable performance would still be achieved. Total failure of the digital system, whilst inconvenient, still allows the aircraft to be flown by virtue of the analogue backup system, which itself is distributed to provide fault tolerance.

Figure 3:
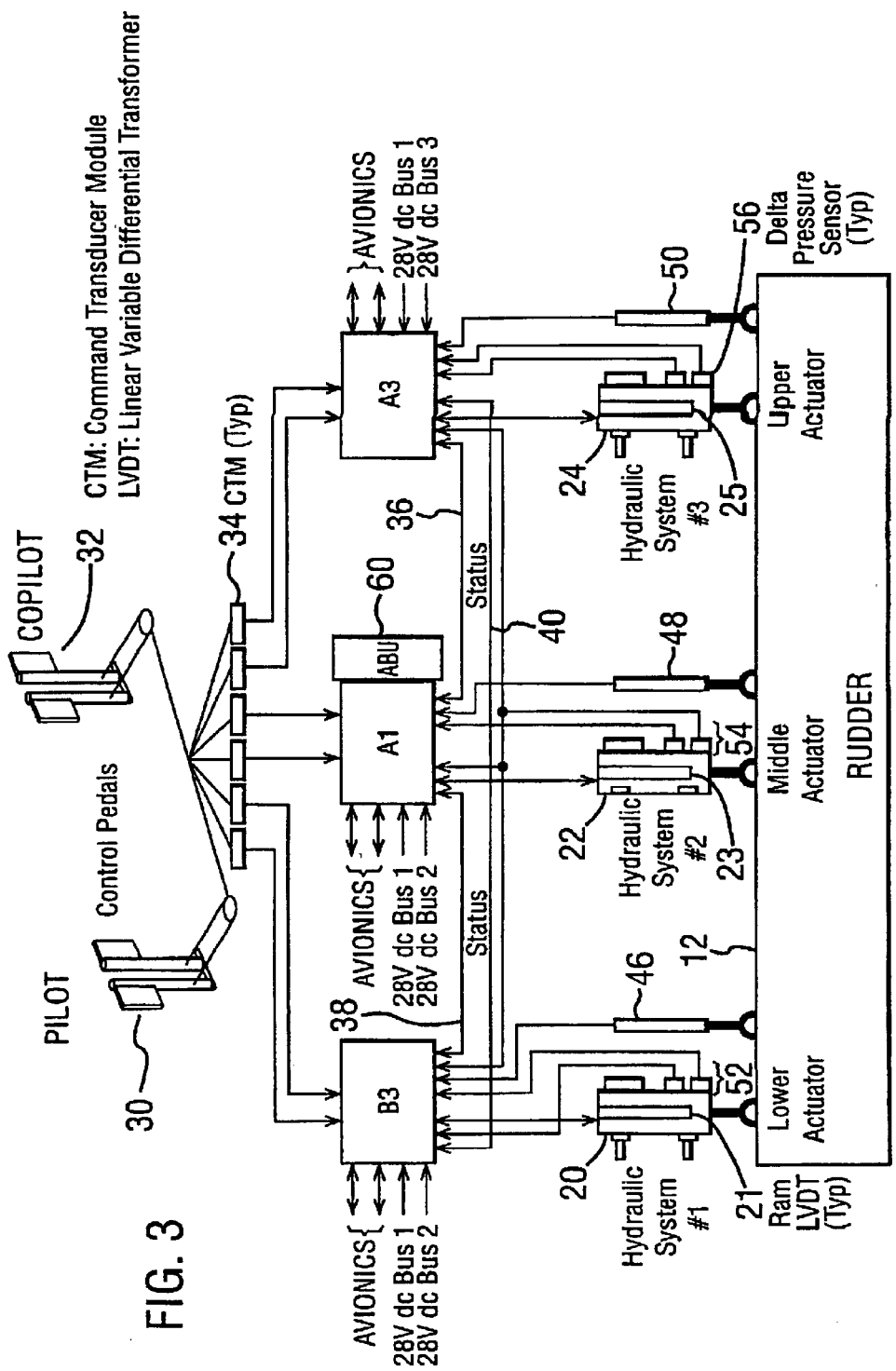
Figure 4:
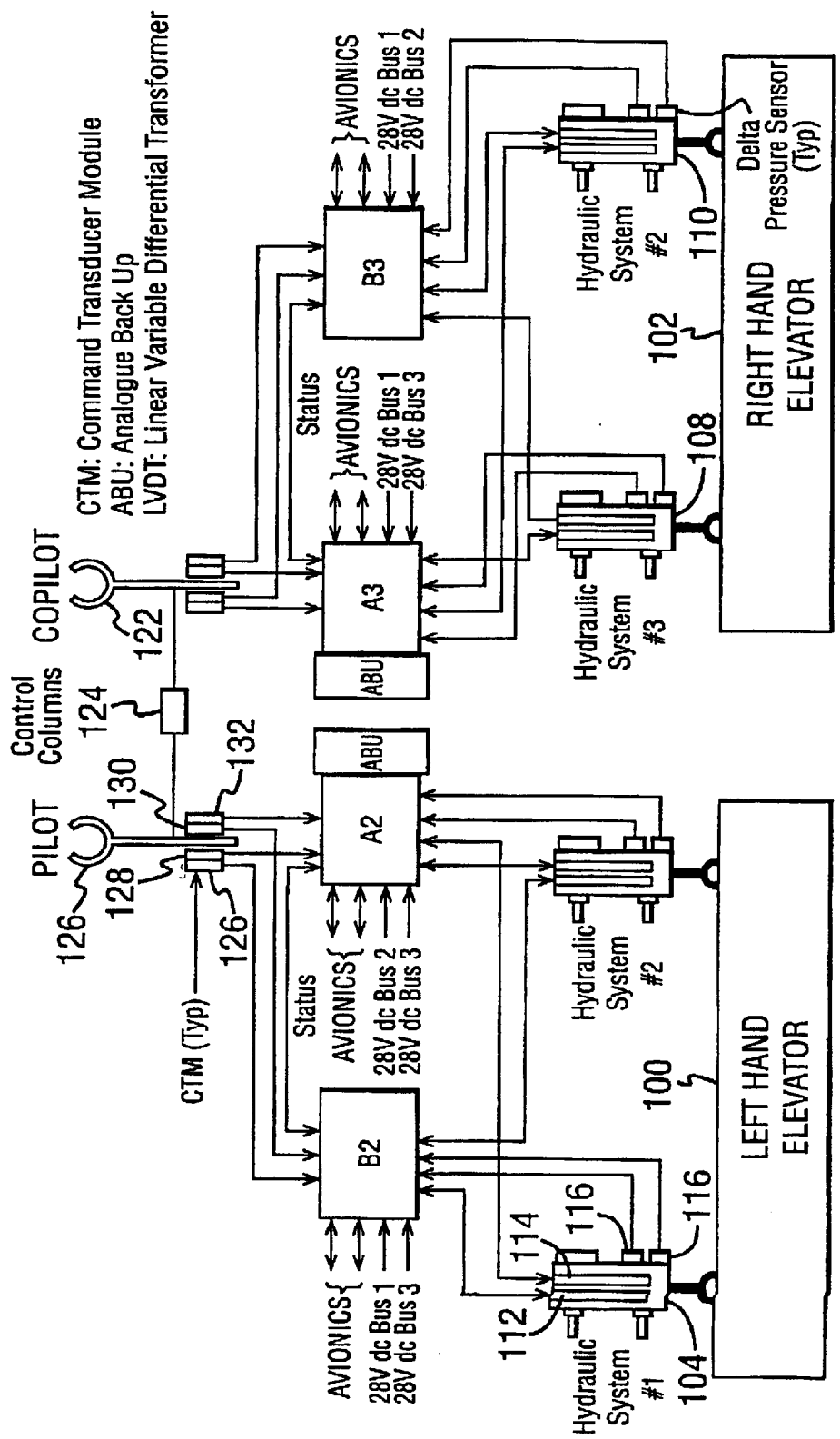
Figure 5:
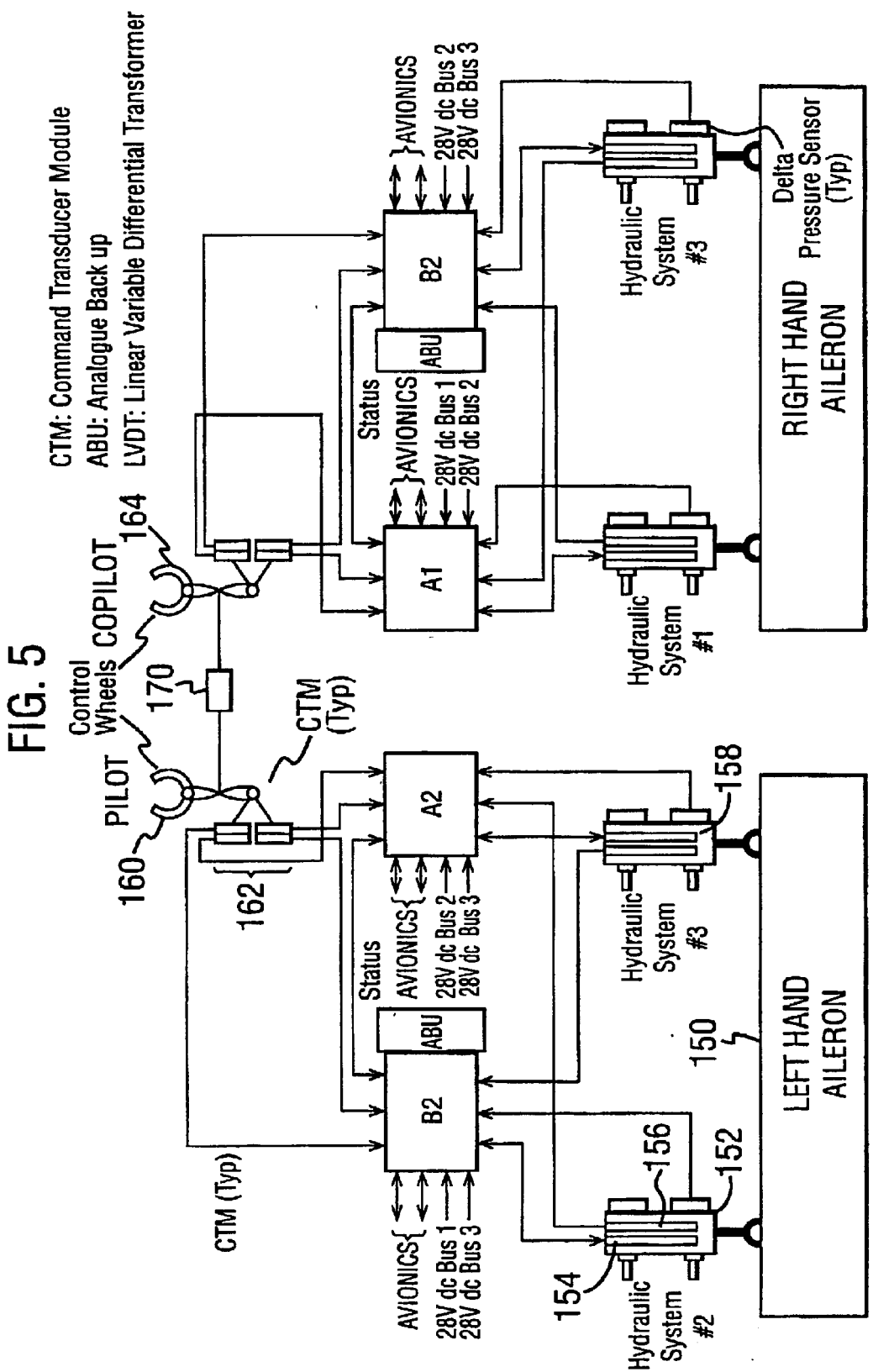
Figure 6:
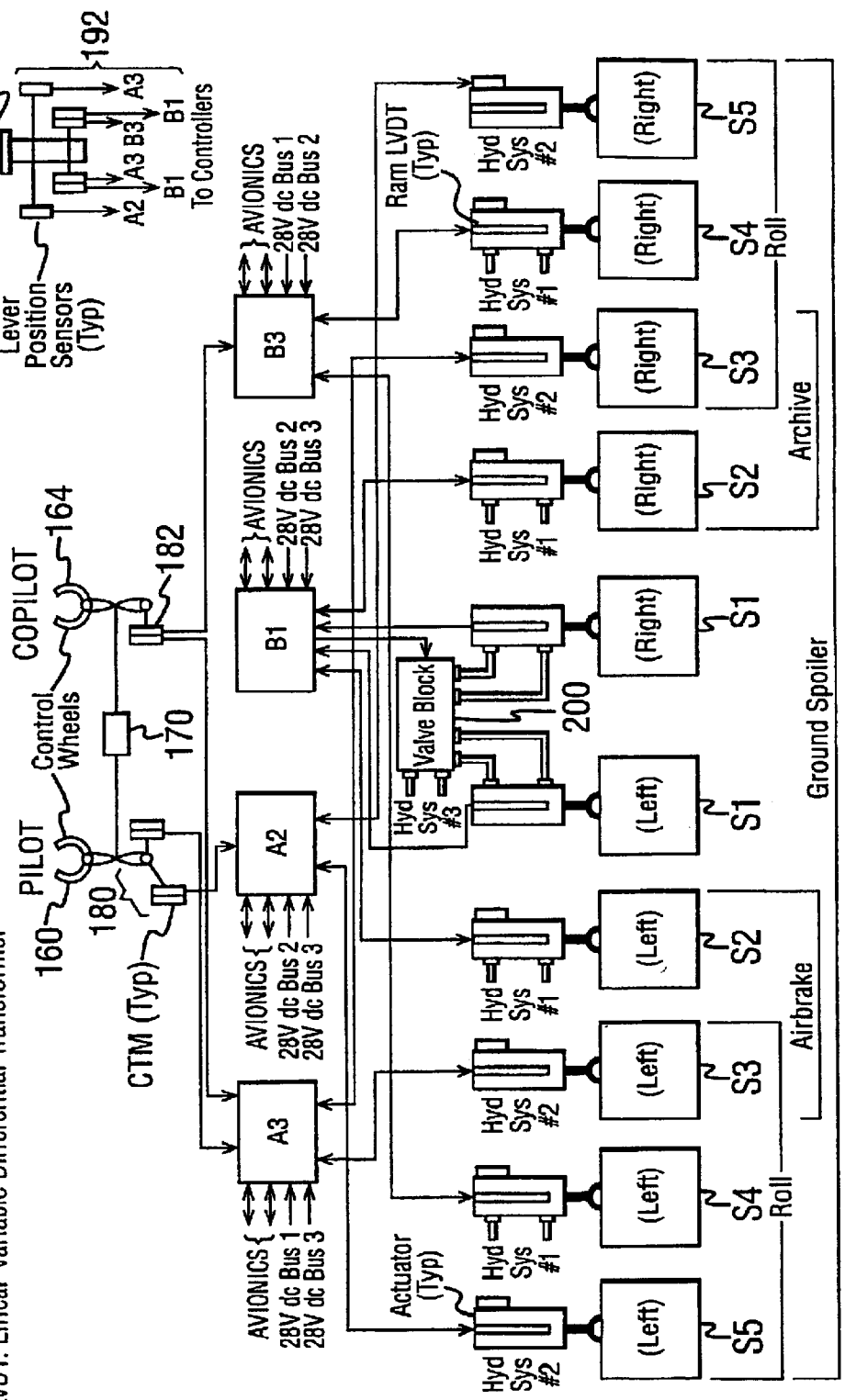
Figure 7:
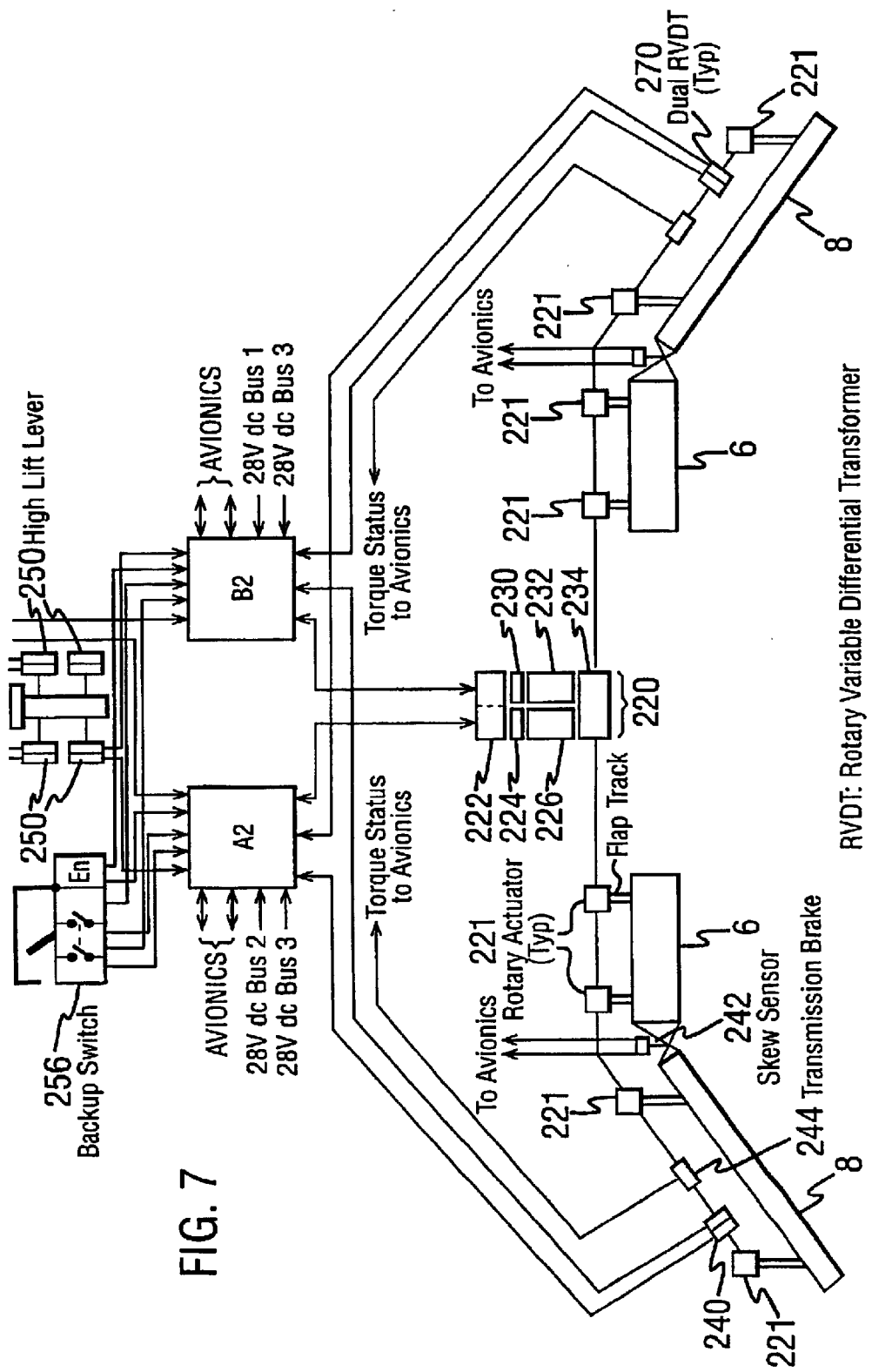
Figure 8:
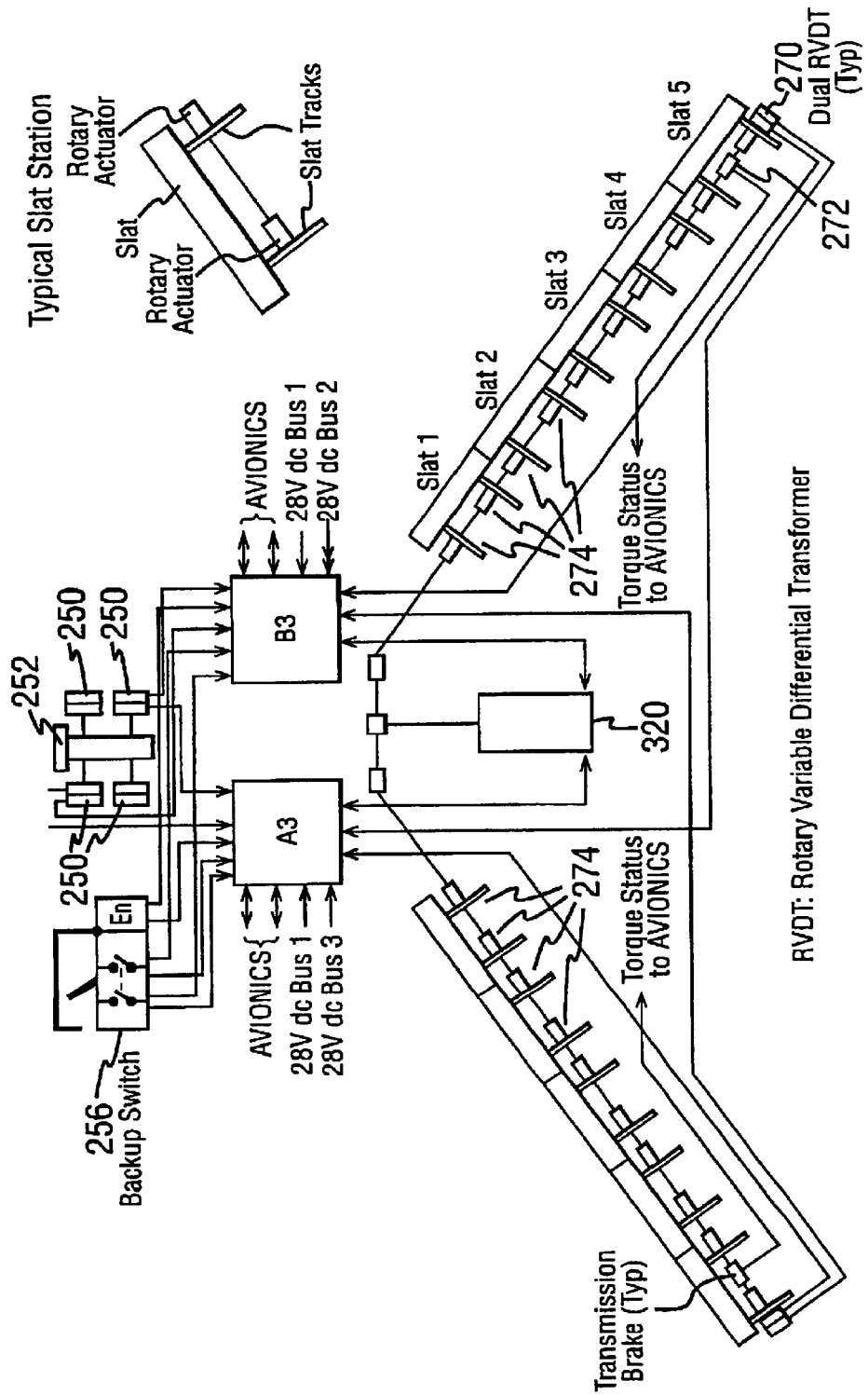
Figure 9:
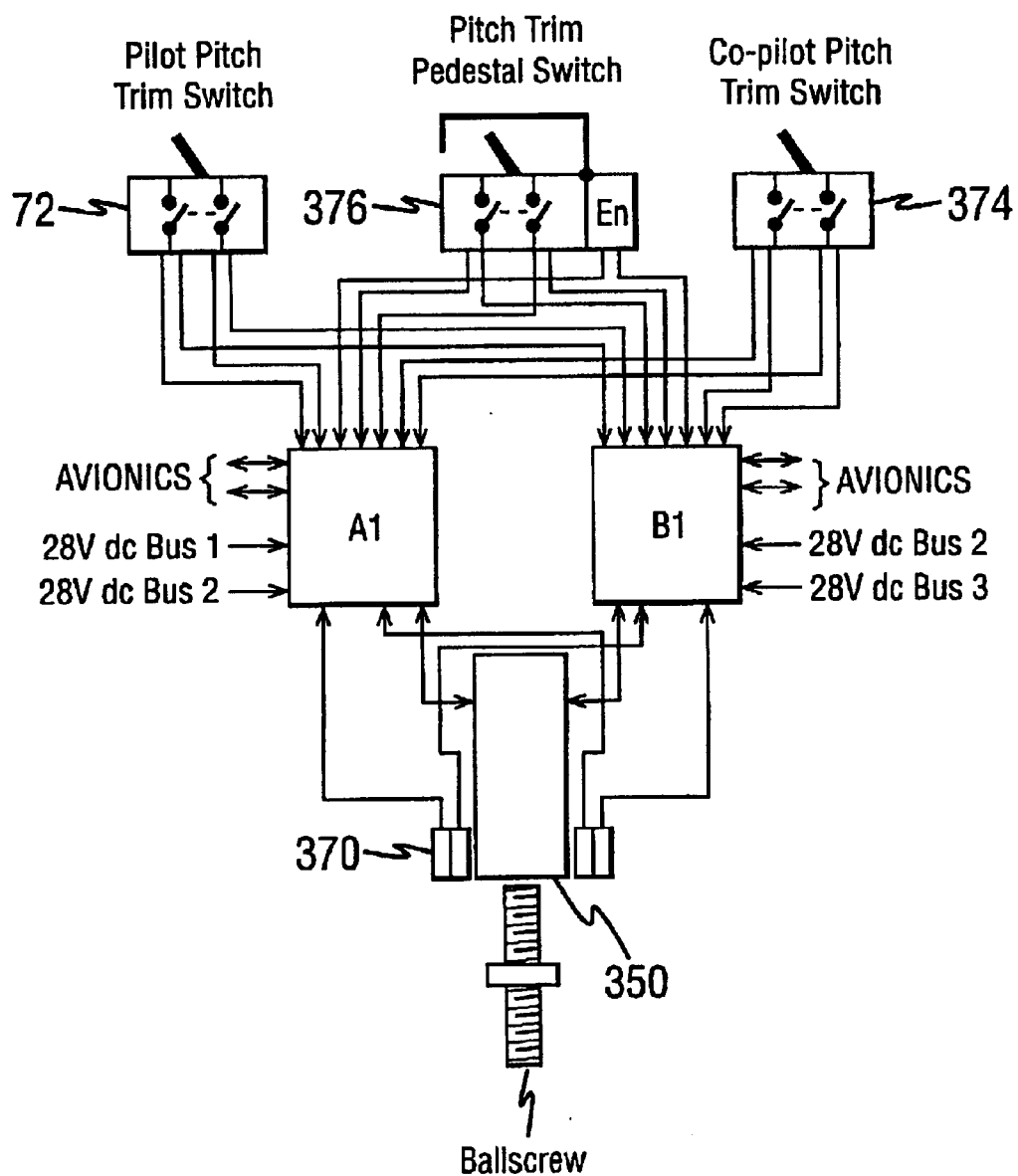
Figure 10:
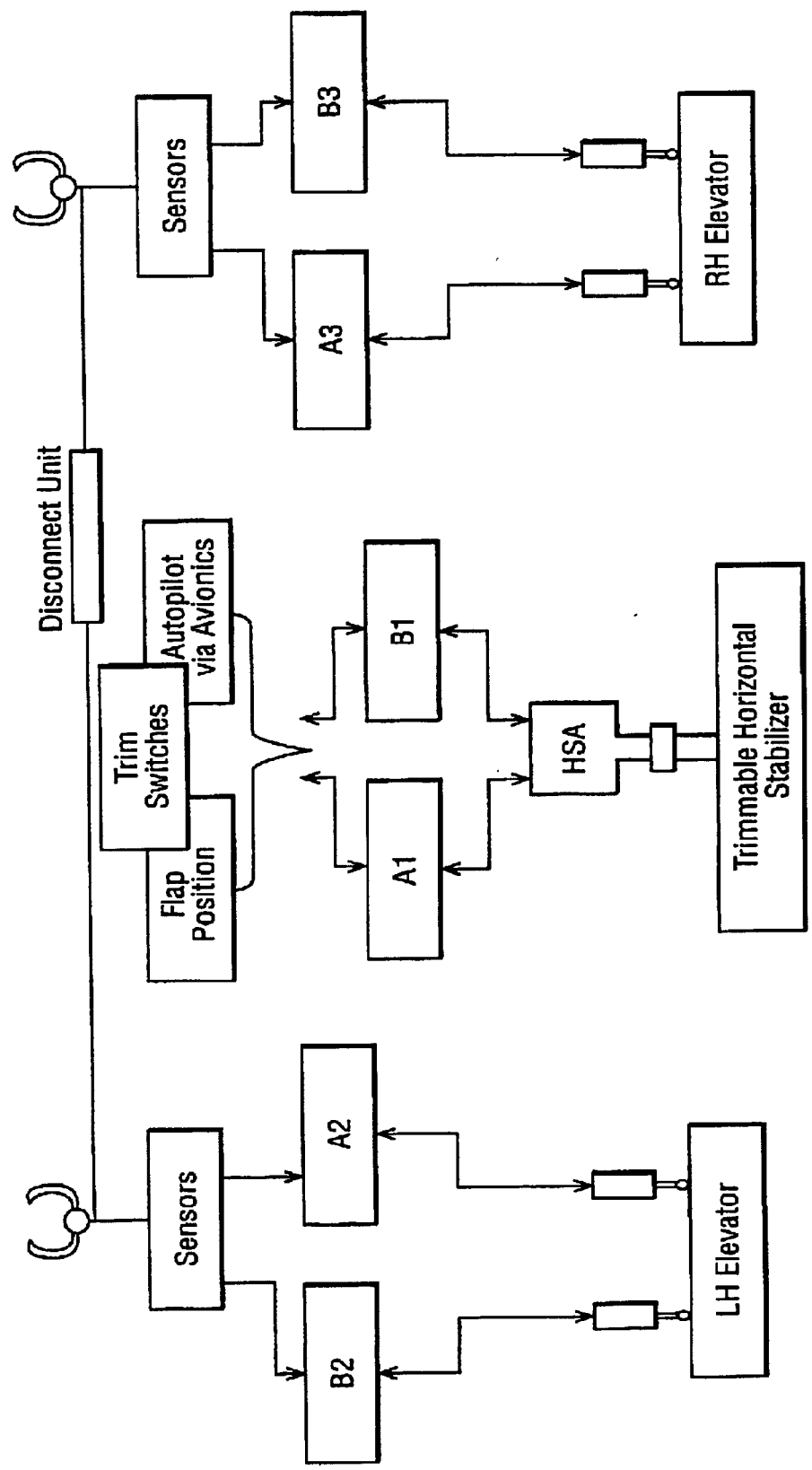
Figure 11:
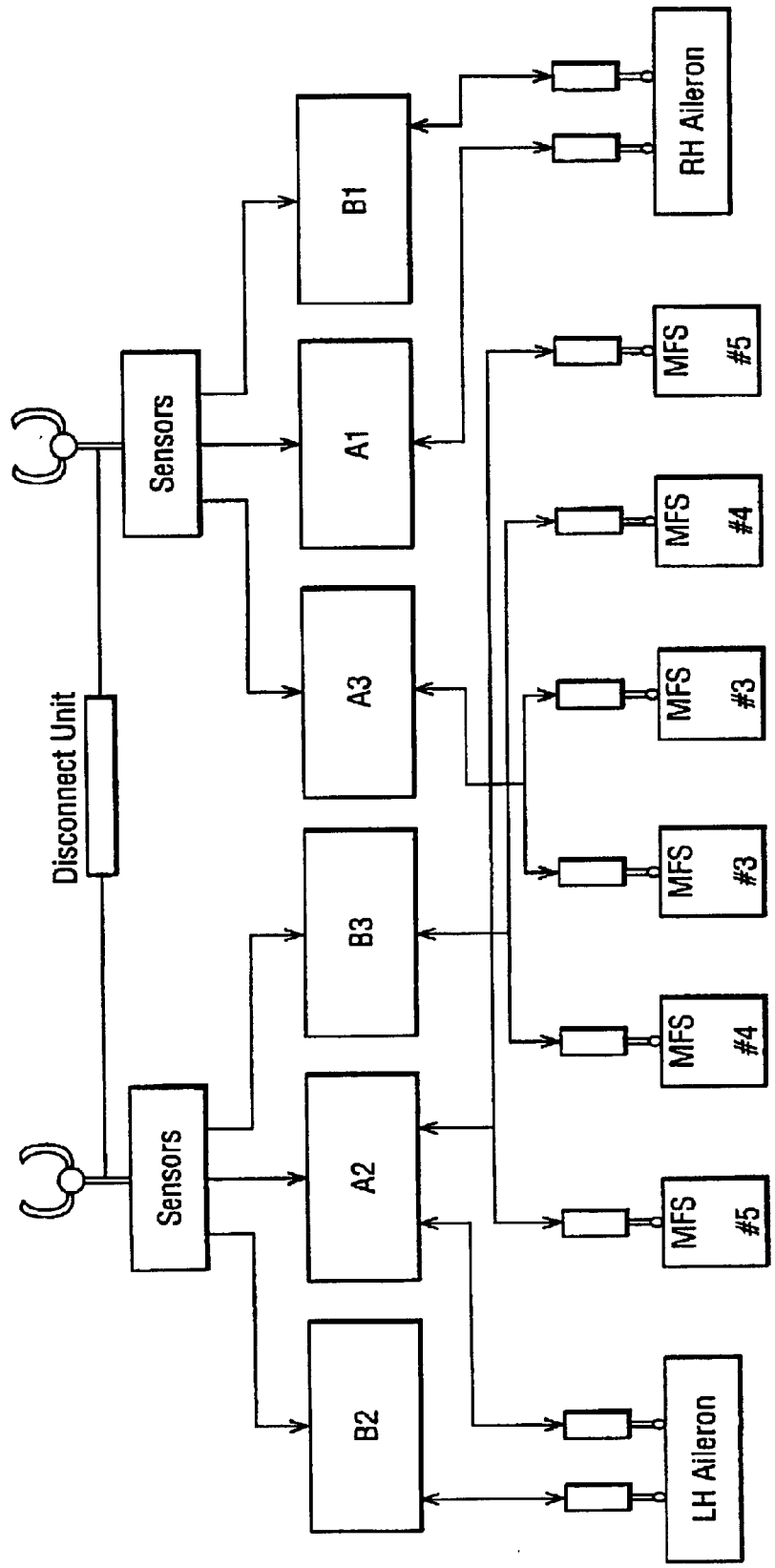
Figure 12:
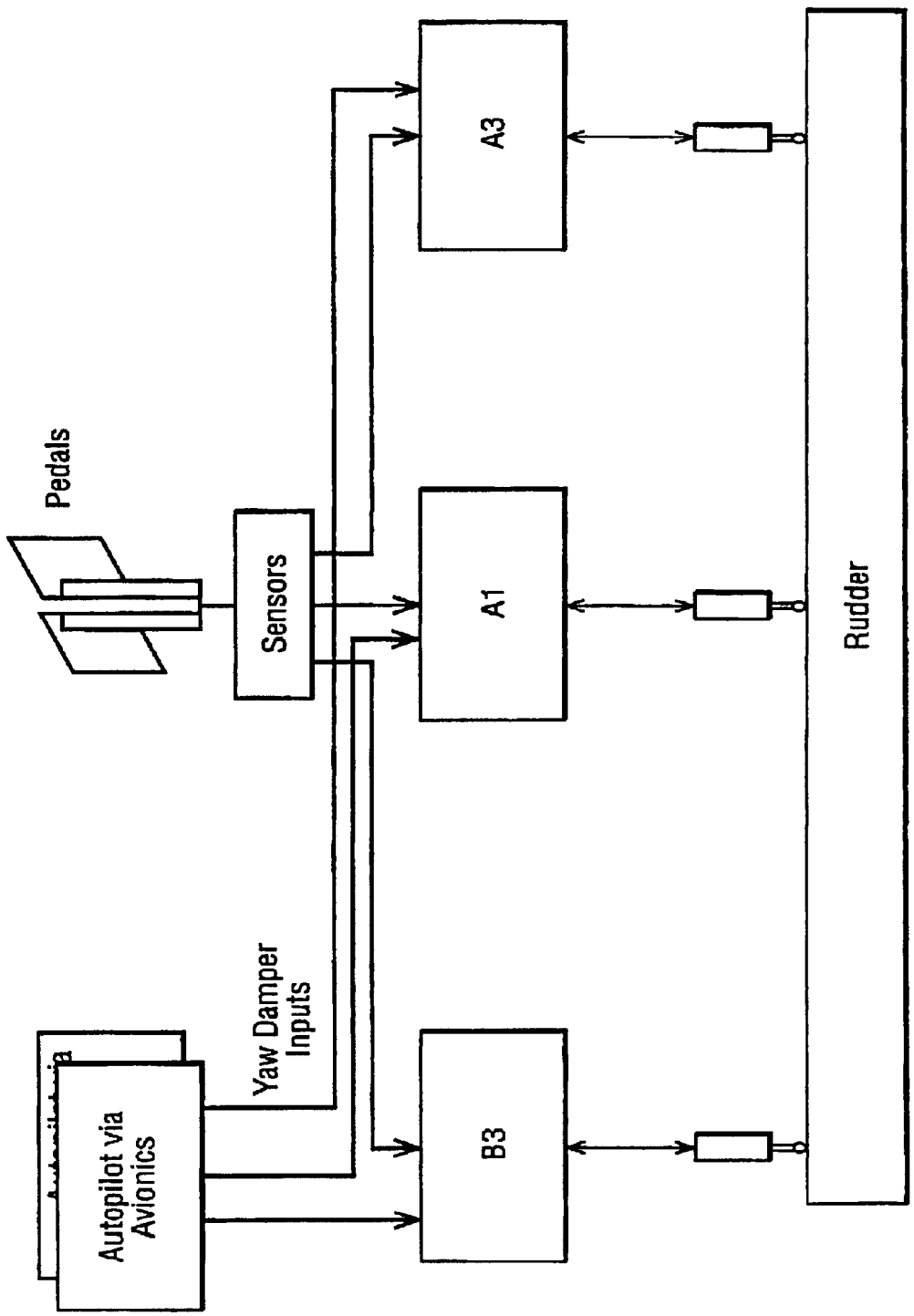
Figure 13:
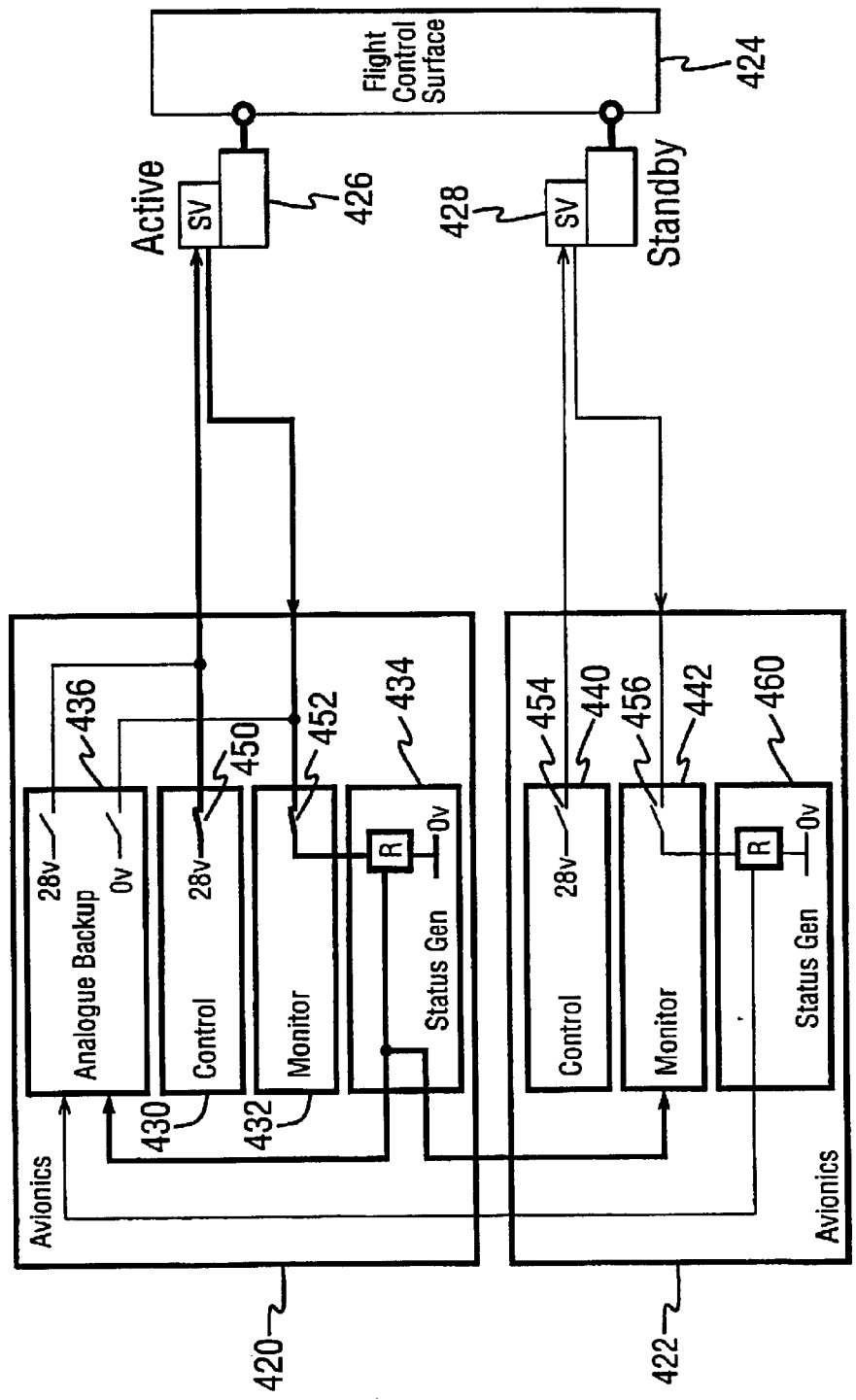

The present invention will further be described, by way of example, with reference to the accompanying drawings, in which:

FIG. 1 schematically illustrates the various flight control surfaces on a commercial jet liner;

FIG. 2 schematically illustrates the allocation of control functions with respect to the flight controllers in an embodiment of the invention;

FIG. 3 schematically illustrates the control system associated with the rudder;

FIG. 4 schematically illustrates the control system associated with the elevators;

FIG. 5 schematically illustrates the control system associated with the ailerons;

FIG. 6 schematically illustrates the control system associated with the spoilers;

FIG. 7 schematically illustrates the control system associated with the flaps;

FIG. 8 schematically illustrates the control system associated with the slats;

FIG. 9 schematically illustrates the control system associated with the trimmable horizontal stabiliser;

FIG. 10 schematically illustrates the components engaged in pitch control;

FIG. 11 schematically illustrates the components associated with roll control;

FIG. 12 schematically illustrates the components associated with yaw control; and FIG. 13 schematically illustrates the interrelation between controllers for a single flight control surface.

As shown in FIG. 1, the flight control system provides the means by which the flight crew and aircraft autopilot control the position of the aircraft flight control surfaces, and hence the aircraft itself.

The aircraft has two aileron surfaces 10 (one per wing), two elevator surfaces 2 (one per trimmable horizontal stabiliser side) and one rudder surface for primary flight control. There are also five spoiler surfaces per wing, four of which are multi-function spoiler surfaces (spoilers 2–5) and one dedicated ground spoiler (spoiler 1). Three of the multi-function spoilers, spoilers 3–5, are used for roll actuation augmentation, two as air brakes (spoilers 2 and 3) and all are used as ground spoilers on landing.

Secondary flight control surfaces include five leading edge slat surfaces per wing, slats 1–5, two trailing edge flap surfaces per wing 6 and 8 and a trimmable horizontal stabiliser 4.

During flight, control of aircraft roll and pitch is achieved using conventional pilot and co-pilot wheels and columns. Yaw control is achieved using conventional pedals and an autopilot yaw damper, and air brakes spoilers are controlled using an air brake lever. The slat and flap positions are selected via a high lift lever, and pitch trim is controlled from switches located on the pilot and co-pilot wheels and a centre pedestal as well as autopilot pitch trim inputs. Advantageously the ground spoiler activation is armed when the air brake lever is in a specified position, and is performed automatically on landing.

Generally, the primary flight control surfaces are controlled by a relatively simple closed loop system, the trimmable horizontal stabiliser surface is controlled in an open loop manner, and the high lift surfaces are moveable between a number of discrete positions.

It is desirable that the aircraft flight surfaces be controlled by a 'fly-by-wire' system with no mechanical reversionary mode. It is therefore high desirable that the fly-by-wire control system be formed in a distributed manner such that the system is fault tolerant of complete failure of one or more controllers therein.

FIG. 2 schematically illustrates the allocation of functions to controllers within a fly-by-wire system constituting an embodiment of the invention. As shown in FIG. 2, there are six controllers in all, each divided into two groups of three, the first group being designated a group A, and the second group being designated a group B. Groups A and B are implemented using dissimilar technologies, i.e. dissimilar hardware and dissimilar software such that there is no common mode failure path between group A and group B.

Each group of controllers is independently capable of providing full flight control of the aircraft. However, it is also possible that a controller within a group may fail in addition to a generic failure of the other group. Thus the functions, that is the control of the individual flight surfaces, must be distributed amongst the controllers in any one channel such that failure of any one of the controllers does not compromise the ability of the fly-by-wire system to control the aircraft. Thus, no single controller has control over both elevators, both ailerons, or the rudder.

FIG. 3 schematically illustrates the rudder control system in greater detail. As shown, the rudder 12 is controlled by three individual actuators 20, 22 and 24 each of which is responsive to a different one of the controllers and each of which is actuated from a different hydraulic system. Thus the first actuator 20, which corresponds to the lower rudder actuator is controlled by controller B3 and connected to hydraulic system 1. The second actuator 22, corresponds to the middle rudder actuator and is controlled by controller A1 and is connected to hydraulic system number 2. The third actuator 24, corresponds to the upper most rudder actuator and is controlled by controller A3 and is connected to hydraulic system number 3. Thus, in an aircraft having three hydraulic systems, failure of any one hydraulic system will still leave two of the actuators able to operate the rudder, and failure of two hydraulic systems will still leave one actuator functional in order to operate the rudder. As shown, each controller also receives two power supplies. The controller B3 receives power from DC bus 1 and DC bus 2, with DC bus 2 being the default bus and DC bus 1 being the backup bus. Controller A1 also receives power from DC bus 1 and DC bus 2, but with bus 1 being the default bus and bus 2 being the backup bus. Controller A3 receives power from the DC bus 3 as its default bus and DC bus 1 as its backup bus. Thus failure of any one bus does not cause any of the controllers A1, A3 or B3 to shut down. Whereas failure of two of the buses may cause one or two, of the controllers to shutdown.

Both the pilot and co-pilot are provided with rudder pedals 30 and 32 respectively which are mechanically interconnected such that operation of one set of pedals will also operate the other set of pedals. A plurality of transducers 34 measure the rudder pedal positions and provide inputs to the controllers B3, A1 and A3. There are six individual transducers shown in FIG. 3, with two of them providing inputs to controller B3, two providing inputs to controller A1 and two providing inputs to controller A3. By arranging that no transducer 34 services more than one controller, B3, A1 or A3, it is possible to stop a fault in one controller being propagated back to the transducers and then being propagated on to another one of the controllers.

Each controller exchanges information concerning its status, i.e. confirmation that it is functioning correctly, with another controller. Thus controllers A1 and A3 confirm their status using interconnection 36, controllers A1 and B3 exchange data with each other via connection 38, and the controllers A3 and B3 exchange status data other via connection 40.

Inputs to the controllers are therefore received via the pilot and co-pilot control pedals and, when engaged, can also be issued via the autopilot for the purposes of yaw damping. These demands come into the rudder system via data buses and discrete signalling from the aircraft avionics systems. The authority of the autopilot yaw damper demand is limited such that the pilot can always override its effect via the pedal inputs. Based on these demands, each of the controllers calculates the desired rudder position and generates control signals for controlling electrohydraulic control valves associated with the actuators. In normal use, all three actuators 20, 22 and 24 are active and hence the controllers need to monitor the actuator positions via respective position sensors 46, 48 and 50 and actuator position sensors 21, 23 and 25. Each actuator also includes pressure sensors 52, 54 and 56 which sense the differential pressure across the actuator piston. These measures of actuator position and differential pressure across the actuator pistons are used by each of the controllers to implement 'force-fight' reduction algorithms in order to ensure that one actuator does not start to fight against the motion generated by one of the other actuators. The controllers may be arranged to scale the flight crew and yaw damper demands as a function of airspeed.

The actuators 52, 54 and 56 are operable in two modes. In the active mode each is driven and controlled by associated electro-hydraulic control valves. However, when not active, the actuators enter a by-pass mode such that they can be back driven. This ensures, in the event of failure of one of the controllers such that it ceases to control its associated actuator, that the remaining actuators can still vary the position of the rudder. If an actuator failed into a hydraulically locked mode, then the rudder itself would become a locked in position and the remaining two operative control channels would be thwarted in their objective of controlling the rudder position. Furthermore, when in bypass mode, the actuators provide a degree of damping which can be used to provide sufficient force for gust damping when the aircraft is on the ground.

Although three digital controllers are provided, one of the controllers, A1, further includes an analogue backup channel 60. The analogue backup becomes active and takes over control of the position of the associated rudder actuator if it senses that none of the other rudder actuators are active. The actuator active information is provided by each of the controllers A1, A3 and B3. The analogue backup includes control and monitoring functionality and will bypass the actuator 22 associated with it if there are any discrepancies in the actuator control.

FIG. 4 schematically illustrates the arrangement of the elevator system. The aircraft has two elevator surfaces, namely a left-hand elevator 100 and a right-hand elevator 102, hinged from the trailing edge of the horizontal stabiliser. The elevators provide the primary means by which the flight crew control the aircraft pitch. A trimmable horizontal stabiliser system provides a secondary means of controlling aircraft pitch. The left-hand elevator 100 is driven by two hydraulic actuators. These are an 'outboard' hydraulic actuator 104 and an 'inboard' hydraulic actuator 106. Similarly, the right-hand elevator 102 is controlled by an inboard hydraulic actuator 108 and an outboard hydraulic actuator 110. Each hydraulic actuator includes electrical transducers installed up the centre of the actuator piston in order to sense its position. These position sensors, for example sensors 112 and 114 in actuator 104 are connected to the controllers associated with that elevator, in this case B2 and A2, such that each controller has knowledge of the position of the actuator 104. Similarly, position signals from actuator 106 are also provided to controllers of B2 and A2. A similar arrangement occurs on the right-hand elevator. Each actuator also includes electrical pressure transducers 116 which sense the differential pressure across the actuator piston and return this information to the controller associated with that actuator. Thus sensors 116 of actuator 104 are only connected to controller B2. Similarly, the pressure sensors of actuator 106 are only connected to actuator A2. As with the rudder controllers, each of the elevator controllers has two power supplies. Thus, controller B2 is connected to DC bus 1 which acts as the default power supply, and DC bus 3 which represents the backup power supply. For the right-hand elevator, controller A3 is connected to the DC bus 3 which represents as default power supply, and to DC bus 1 which acts as the backup, whereas controller B3 is connected to DC bus 2 which represents the default power supply and DC bus 1 which represents its backup. Thus failure of any one of the power supplies will leave the control system unaffected, whilst failure of two of the power supplies will take down some of the controllers but will leave one functional controller on each side of the aircraft. The hydraulic actuators are also connected to different hydraulic systems. Thus actuator 104 is connected to hydraulic system 1, actuator 106 connected hydraulic system 2, actuator 108 connected to hydraulic system 3 and actuator 110 connected to hydraulic system 2. Thus failure of any single hydraulic system will not result in loss of control of the elevators whilst failure of any two hydraulic systems (which would be an extremely rare event) will still leave one of the elevators functional.

The pilot and the co-pilot have control columns 120 and 122 respectively. The columns are interconnected via a disconnect device 124 which operates such that both columns move together under normal circumstances but can be operated individually in the event of either column becoming jammed. The left-hand elevator position is determined via position sensors, 126, 128, 130 and 132. Each transducer provides one output to either one of the controllers B2 and A2 such that each controller receives two measurements of the pilot's column position. A similar arrangement is provided by four sensors provided to measure the position of the co-pilot's column in order to derive control signals for the right-hand elevator.

The column positions as sensed by the sensors are delivered to the controllers B2, A2, A3 and B3 which then calculate the required elevator positions based on the input signals.

Normally, each elevator surface is simultaneously controlled by two controllers and their respective hydraulic actuators. Thus, as with the rudder, each hydraulic actuator and controller is included within a 'force-fight' reduction control loop in order to prevent the actuators from working against each other. In the event of failure of any one of the controllers, either because of failure within a controller itself, power supply disruption to the controller, failure of sensors to the controller or failure or errors occurring within the hydraulic system associated with a controller, the associated hydraulic actuator can be switched from an active mode to a damped mode in which the actuator can be back driven but will produce a force which opposes the back driving motion. Thus, in the event of minor failures, such as failure of one controller, both elevators will still be operative with one elevator being driven by two actuators, whilst the other elevator is only driven by one. However, in the event of more severe failures, for example failure of two hydraulic systems, such as systems 1 and 2, then one elevator would become undriven (but which would still be damped), whilst the other elevator would still be driven via only one actuator.

However, as noted hereinbefore, pitch control can still be achieved through the use of one elevator and the trimmable horizontal stabiliser.

As shown in FIG. 4 controllers A2 and A3 also include analogue backups for the left-hand and right-hand inner most actuators of the elevators. The analogue backup for the left-hand elevator will commence operation when it determines that neither of the digital channels in controllers A2 or B2 are operative. Similarly the analogue backup for the right-hand elevator will commence operation if it determines that neither of the digital channels A3 or B3 are operative.

FIG. 5 schematically illustrates the aileron system for the aircraft. It can be immediately seen that the aileron system shown in FIG. 5 effectively mirrors the arrangement provided for the elevators as illustrated in FIG. 4. Thus, the left-hand aileron 150 is driven by an outboard actuator 152 which in turn is controlled by controller B2. The actuator 152 includes position sensors 154 and 156 therein which provide additional information to the controller B2 for the outboard left-hand actuator and to controller A2 which primarily controls the inboard left-hand actuator 158. Each actuator is provided with pressure transducers for determining the differential pressure across the actuator cylinder. Each of the controllers A2 and B2 has two power supplies, and these are selected such that only one of the power supplies is common to both controllers. Each controller, B2 and A2 receives positional information from the pilot control wheel 160 by way of a block of four sensors 162 which is arranged such that each sensor only provides a single output and that two of the sensors provide outputs to controller B2, whereas two of the sensors provide outputs to controller A2. A similar arrangement is repeated for the right-hand aileron control system with the supply buses to the controllers A1 and B1 for the right-hand aileron being selected as shown with respect to FIG. 2 and the connections between the various hydraulic actuators and the 3 aircraft hydraulic systems being selected as shown in FIG. 5.

In normal use, the pilot and co-pilot wheels are mechanically connected via a disconnect device 170 which allows the pilot wheel 160 to be disconnected from the co-pilot's wheel 164 in the event of jamming of either wheel. The left-hand aileron position is determined by the position of the pilot's wheel whereas the position of the right-hand aileron is determined by the position of the co-pilot's wheel. When the aircraft is operating normally, both controllers and their hydraulic actuators associated with either aileron are active such that each controller analyses the output of the sensors 162 to determine the demanded position of the aileron and on this basis calculates the required hydraulic actuator position, compares this with the current position, and instructs open or closing of hydraulic control valves as appropriate in order to cause the actuator to move to the required position. Since both hydraulic actuators are active, force fight reduction must be implemented and this is achieved by comparing the differential pressure across the actuators in order to determine which one is bearing the most significant load and seeking to reduce this pressure whilst maintaining the aileron at the required position.

In the event of failure of any part of the control system associated with a hydraulic actuator, or the actuator itself, the relevant actuator is switched from an active mode to a passive mode where it can be back driven, that is to say that the actuator is not hydraulically locked in position. This is important since hydraulic locking of an actuator would frustrate the action of the remaining working actuator to control that flight surface.

As with the elevator control system, the control units may scale the pilot demands as received from the control wheels as a function of air speed before arriving at the required actuator movement. Failure of any one single power bus has no effect on the operation of the flight control system, whereas failure of two buses has potential to remove one controller for each of the ailerons, but whilst still leaving one controller active for each aileron. Controllers B2 and B1, which control the outermost actuators of the ailerons also include analogue backup units which commence operation when a unit determines that neither of the digital systems B2 or A2 or B1 and A1 is actually controlling the associated aileron. The controllers are configured to exchange health status data for example via data buses which have been omitted from the diagram for clarity.

FIG. 6 schematically illustrates the arrangement of the spoiler system. As described with reference to FIG. 1, all the spoilers act as ground spoilers to slow the aircraft after landing or following an aborted takeoff. Air braking to slow the aircraft whilst in flight is performed by spoiler pairs 2 and 3 with roll assist being provided by spoiler pairs 3, 4 and 5. As shown, a single hydraulic actuator actuates each spoiler surface. Spoiler pair 1 which act only as ground spoilers S1 left and S1 right are controlled as 'bang/bang' spoilers, that is they are either fully retracted or fully extended. The spoilers S1 left and S1 right are controlled from a single hydraulic manifold 200 located in the fuselage of the aircraft. Spoiler pairs S2 to S5 which implement a variety of functions are proportionately controlled. The 10 spoilers are divided between the controllers A3, A2, B1 and B3 such that, working from left to right in FIG. 6, the configuration is as follows:

| Spoiler | Controller |
| --- | --- |
| 5 left | A2 |
| 4 left | B3 |
| 3 left | A3 |
| 2 left | B1 |
| 1 left | B1 |
| 1 right | B1 |
| 2 right | B1 |
| 3 right | A3 |
| 4 right | B3 |
| 5 right | A2 |

As with the systems described with respect to the rudder, the ailerons and the elevators, each controller has dual dissimilar electrical supplies arranged as primary supply and backup supply in accordance with the information set out in FIG. 2. Position sensors 180 and 182 are provided to monitor the positions of the pilot and co-pilot's control wheels 160 and 164 respectively, and to supply this information to appropriate ones of the controllers as shown in FIG. 6. Also, as shown in FIG. 6, an air brake/ground spoiler arming lever 190 has a sensor block 192 associated with it in order to monitor the lever position and to supply outputs to the control units as indicated in FIG. 6.

In use, the flight crew arm the ground spoiler function during the approach phase by selecting the ground spoiler arm position on a centre pedestal mounted air brake lever. When the aircraft lands, the spoiler system is arranged to deploy all spoiler panels provided that various safety interlocks are satisfied. Such safety interlocks include throttle position and the detection of weight being borne by the undercarriage. If the flight crew abort take-off or select reverse thrust, then the spoiler system automatically deploys all spoilers to slow the aircraft.

Operation of the air brake lever into the air brake position of its travel allows the flight crew to demand deployment of the air brake spoilers S2 and S3 on either side of the aircraft. The extent of their deployment is proportional to the lever position. Spoiler roll assist demands for spoiler pairs S3, S4 and S5 are determined from the position of the flight crew wheel positions. In contrast to the aileron control system, wheel positions from the pilot's wheel 160 are supplied to controllers which control spoilers on both the left and right-hand sides of the aircraft. Similarly, the co-pilot's wheel position is also sent to controllers which control spoilers on both the left and right-hand sides of the aircraft. As shown in FIG. 6, any spoiler pair (for example S5 left and S5 right) are driven from the same hydraulic supply and are controlled by the same controller such that they fail in unison. Thus failure of any of the control system components is manifested by symmetrical failure of spoiler pairs.

Since each spoiler is only actuated by one associated actuator, there is no need to implement force fighting algorithms for this part of the control system. However, the actuators are modified such that they are mechanically biased to return to the retracted position in the event of component or hydraulic system failure.

FIG. 7 schematically illustrates the flap control system. As shown in FIG. 1, each wing of the aircraft has two trailing edge flap high lift surfaces. These surfaces are deployed to enhance the aerodynamic lift characteristics of the wing to enable slow speeds during takeoff and landing. The flaps can be deployed at four positions as demanded by the flight crew. This enables different settings for takeoff according to the ambient conditions and aircraft weight and a progressive increase in the lift performance during aircraft approach to landing. The flaps 6 and 8 on each side of the aircraft are intended to be deployed together. The flap deployment mechanism does not constitute part of the invention but will be described for completeness. Each flap surface 6, 8 is supported on two trolleys running on straight tracks, the trolleys are pushed along the track using a crank/slider mechanism to deploy the flap surfaces. Rotation of the flap surfaces is achieved by rotary actuators 221. The rotary motion of an actuator 221 controls the flap position by rotating the crank mechanism. The rotary actuators are driven by a rigid transmission system from a central power drive unit 220.

The power drive unit 220 is configured with two motors such that either motor can drive the flap system while the other is stationary.

Each flap includes a rotary variable differential transducer 240 provided as part of its drive mechanism in order to detect the position of the flaps. Additionally, a skew sensor 242 is also provided in order to ensure that the flaps are operating in a synchronised manner and an electrically operable transmission brake 244 is provided in order to lock the flaps into position in the event of failure of the drive mechanism.

The controllers A2 and B2 are responsive to detectors 250 for detecting the position of the high lift lever.

In use the flight crew can select the flap position using the single high lift demand lever in the cockpit. The two controllers A2 and B2 monitor the high lift lever sensors 250 to determine the flight crew demand. The controllers A2 and B2 are located in separate avionics bays. The controllers work in conjunction with the power drive unit 220 in order to control the deployment and stowage of the flaps. A continuous transmission system runs from the power drive unit along each wing to the rotary actuators. This ensures symmetrical operation of the flap surfaces. The rotary actuators are in the form of high ratio reduction gearboxes. At each actuator there is torque limiter which protects the flap support structure in the case of a jam in the crank/slider mechanism by locking the transmission system. The system includes transmission brakes between the actuators on the outboard flap panels. They actively prevent flap movement in the unlikely event of mechanical disconnection between the drive unit 220 and any of the actuators.

When a controller detects that the flight crew have selected a new flap position, it signals the power drive unit 220 to run at full operating speed. When the flap system gets close to the selective position, the power drive unit is controlled to slow the motor. As the flap reaches the selected position, the controller signals the power drive unit to stop. This two-speed operating strategy ensures that the flap system is accurately positioned whilst giving reasonable speed of deployment. The controllers A2 and B2 continually monitor the system for correct operation and stop the system and issue a warning to the flight crew if a fault occurs.

FIG. 8 schematically illustrates the aircraft slat system. The slat system is in many ways similar to the flap system described with respect to FIG. 7. As shown in FIG. 1, the aircraft has five leading edge slat high lift surfaces. These slat surfaces are deployed to enhance aerodynamic characteristics of the wing in order to enable slow speed flight to occur during takeoff and landing. The slats can be deployed as demanded by the flight crew. This enables different settings for takeoff according to the ambient conditions and aircraft weight, and a progressive increase in lift performance during approach to landing. As shown, control units A3 and B3 are each responsive to sensors 250 which monitor the position of the high lift lever 252, as was herein before described with reference to FIG. 7. The controllers A3 and B3 also connect to a power drive unit 320 which is identical to the device 220 described hereinbefore. Each of the slats, slat 1 to slat 5, on each wing is carried by two curved racks. The racks are driven by a rack and pinnion gear system which is driven by the rotary actuators 274 (of which some are labelled in FIG. 8). As with the flap system, the pilots can select a high lift position using the high lift lever and the controllers, acting on this, cause the power drive unit 320 to operate in order to position the slats at the required position. A position sensor 270 monitors the position of the slats and a brake 272 is provided in order to hold the slats in position, in the event of failure of the mechanical linkage between the slat actuators and the drive unit actuator 320.

When a controller detects the flight crew have selected a new slat position, it signals the power drive unit 320 to start the running at full operating speed. As the slat system approaches the selected position, it signals the power drive unit to slow, and when the slats arrive at the selectived position, the power drive unit is stopped. The controllers monitor the system for correct operation and issue a warning to the pilots in the event further malfunction is detected.

FIG. 9 schematically illustrates the control system for the trimmable horizontal stabiliser. The purpose of the trimmable horizontal stabiliser is to permit the elevator surfaces to be at an un-deflected position, except during flight manoeuvres. Trimming is achieved by changing the angle of the stabiliser relative to the fuselage on which it is mounted. When airborne, this trimming changes the angle of attack of the surface and results in a change in the pitching moment on the aircraft.

The trimmable horizontal stabiliser is controlled by an actuator which is attached to the centre of the leading edge of the stabiliser just after the rear pressure bulkhead. The actuator comprises a ball-nut co-operating with a ball-screw, the ball-screw being driven via a rotary power unit and gear box. In FIG. 9, power drive unit 350 is configured with two motors such that either motor can drive the ball-screw while the other is stationary. Each of the motors is under the control of an associated controller, A1 or B1. As shown, controller A1 receives power via 28 volt DC bus 1 and 28 volt DC bus 2, whereas controller B1 receives power via 28 volt DC bus 2 and the 28 volt DC bus 3. Thus failure of any single bus will not cause either of the controllers to fail. Each controller receives data from a plurality of displacement transducers 370. As shown, four individual transducers are provided such that each transducer provides only a single output to each one of the controllers A1 and B1, and each controller receives signals from two transducers. The controllers are also responsive to a pilot trim control switch 372, a co-pilot pitch trim control switch 374 and a pedestal pitch trim control switch mounted between the pilot and co-pilot.

Either the pilot or co-pilot can control the stabiliser by means of trim switches 372 and 374 or via the pedestal mounted switch 376. When engaged, the autopilot is also able to control the pitch trim system via direct electrical signalling into the control channels of the actuator. Control demands from the pilot or auto pilot are switched signals indicating either trim up, trim down or trim hold. Once one of the pilots or the auto pilot has indicated that the trim should be adjusted, the controllers A1 and B1 cause the electric power drive unit 360 to drive the trimmable horizontal stabiliser. The two motors are linked through a differential gearbox such that either motor may work to control the stabiliser even if the other one has failed. When not rotating, the motors are held by integral brakes. The rate of trim control is calculated by the controllers A1 and B1 as a function of airspeed. The speed demands that come from each of the controllers are commensurate with achieving half the required stabiliser rate of movement. With both channels operating normally, the stabiliser then moves at the desired rate. Failure of one channel of control will cause the stabiliser to move at half the desired rate.

Automatic operation of the stabiliser is also provided for by the controllers. This automatic trimming occurs as the flaps are deployed since movement of the flaps moves the centre of lift of the aircraft. The change in the centre of lift creates a pitching moment that is predictable and can be countered by changing the angle of attack of the trimmable horizontal stabiliser automatically.

FIG. 10 schematically illustrates the features of the control system which combine in order to provide pitch control. Thus, the left-hand elevator is controlled by controllers A2 and B2, the right-hand elevator is controlled by A3 and B3 and the trimmable horizontal stabiliser is controlled by controllers A1 and B1. Thus a common mode failure taking out one of the channels completely, for example the A channel, would still leave sufficient B channel controllers operative for full flight control of the aircraft. A failure of a further one of the B channel controllers would still leave sufficient control of the flight surfaces in order to maintain pitch control of the aircraft.

FIG. 11 schematically illustrates those components associated with roll axis control. It can be seen that the left-hand aileron is controlled by controllers B2 and A2, the right-hand aileron is controlled by controllers B1 and A1, and various pairs of spoilers are controlled by controllers A2, A3 and B3. Thus, again, a common mode failure taking out one of the channels completely, for example the A channel, would still leave sufficient B channel controllers operative for full flight control of the aircraft. A failure of a further one of the B channel controllers would still leave sufficient control of the flight surfaces in order to achieve roll control.

FIG. 12 schematically illustrates yaw axis control system. Yaw axis control is less critical since the rudder is not required to turn the plane and yaw control can also be achieved through differential thrust provided by engines on opposing sides of the aircraft. However, it will be seen that since the rudder is controlled by controllers A1, A3 and B3, common mode failure of either one of the A or B channels still results in the rudder being controllable.

FIG. 13 schematically illustrates the arrangement between two controllers 420 and 422 which are arranged to control a flight control surface 424 via respective actuators 426 and 428. As shown in FIG. 14 the controller 420 and actuator 426 are designated as the active channel and the controller 422 and actuator 428 are designated as a standby channel. In this configuration, only one channel controls the flight control surface at any one time. However, an equally valid approach to this 'active-standby' arrangement is an 'active-active' arrangement in which both channels simultaneously control the flight control surface and both channels implement a 'force fight reduction' algorithm in order to prevent the channels from acting against each other.

With the active channel 420 controlling the actuator 426, a control part 430, a monitor part 432 and a status generator 434 of the active channel 420 are all connected by the control line to the actuator 426. However an analogue backup controller 436 remains disconnected at this time. In this arrangement, a control part 440 and a monitor part 442 of the standby channel 422 remain disconnected from the standby actuator 428, although the monitor part 442 does receive data from the status generator 434 of the active channel.

In the event that a fault is detected in the active channel, switches 450 and 452 which had previously connected the control and monitor portions 430 and 432, respectively, to the actuator 426 are opened. Simultaneously switches 454 and 456 which had previously been open are closed so as to connect the control part 440 and monitor part 442 of the channel 422 to actuator 428. Whilst in this configuration, a status generator 460 associated with the channel 422 monitors the drive to the actuator 428 and in the event of a failure being detected in the actuator 428 or in the control channel 440 or the monitor channel 442, sends a signal to the analogue backup controller 436 giving it the authority to connect itself to the actuator 426 and to take over control of the actuator 426.

It is clear that the arrangement described here and above can be easily modified to operate in an 'active-active' configuration, wherein both channels 420 and 422 act to control the flight surface 424 simultaneously. However, in the event of failure of any one channel the remaining channel assumes total responsibility for controlling the flight surface. In the event of failure of that remaining channel, responsibility is then passed to the analogue backup controller.

It is thus possible to provide a highly fault tolerant distributed avionics control system enabling full 'fly-by-wire' functionality to be implemented safely within an aircraft.

What is claimed is:

1. A flight surface control system for an aircraft, the control system comprising first and second groups of controllers arranged such that in the event of failure of the entirety of one of the groups of controllers and the failure of a further controller the remaining operative controllers control sufficient ones of the flight surfaces to provide continued safe flight and landing, and further including analogue controllers independent from the digital control circuitry for providing control of sufficient flight surfaces to provide continued safe flight and landing in the event of failure of all the digital controllers.

2. A flight control system for an aircraft as claimed in claim 1, in which the first group consists of three controllers and the second group consists of three controllers.

3. A flight surface control system for an aircraft as claimed in claim 1, in which the aircraft has left and right elevators and a trimmable horizontal stabiliser, and a pair of functioning controllers in any one of the groups of controllers is able to control pitch of the aircraft via the left hand side and right hand side elevators, or via one elevator and the trimmable horizontal stabiliser.

4. A flight surface control system for an aircraft as claimed in claim 1, in which the aircraft has an aileron and at least one spoiler pair, and in which any working pair of controllers are able to control roll via the left hand side and right hand side ailerons or via one aileron and a spoiler pair.

5. A flight surface control system for an aircraft as claimed in claim 1, in which following the failure of one group of controllers and one further controller, the remaining operative controllers are able to provide at least pitch and roll control.

6. A flight surface control system for an aircraft as claimed in claim 1, in which the first group of controllers are dissimilar to the second group of controllers so that they do not have a common mode failure path.

7. A flight surface control system for an aircraft as claimed in claim 1, in which the aircraft has a left inboard aileron actuator, a left outboard aileron actuator, a right inboard aileron actuator and a right outboard aileron actuator, and wherein no more than one aileron actuator is driven from any one controller.

8. A flight surface control system for an aircraft as claimed in claim 7, in which the task of driving the aileron actuators is equally distributed between the first and second groups of controllers.

9. A flight surface control system for an aircraft as claimed in claim 7, in which the aircraft has multifunction spoiler pairs which can be used to augment or replace functionality of the ailerons, and control of at least some of the multifunction spoiler pairs is performed by a controller not involved in control of the ailerons.

10. A flight surface control system for an aircraft as claimed in claim 2, wherein the aircraft has a left inboard elevator actuatar, a left outboard elevator actuator, a right inboard elevator actuator and a right outboard elevator actuator, as wherein no more than one actuator is driven from any single controller.

11. A flight surface control system for an aircraft as claimed in claim 10, in which control of the trimmable horizontal stabiliser is distributed amongst controllers not engaged in control of the elevators.

12. A flight surface control system for an aircraft as claimed in claim 1, in which the aircraft has three controllers A1, A2 and 3 in a first group of controllers, and the flight controllers have functions distributed between them such that:

A1 controls an aileron on a first side of the aircraft, one rudder actuator and a trimmable horizontal stabiliser;
A2 controls an aileron on a second side of the aircraft and one of the elevators; and
A3 controls another one of the rudder actuators, the other one of the elevators and a spoiler pair.

13. A flight surface control system for an aircraft as claimed in claim 12, in which controller A2 further controls a multifunction spoiler pair.

14. A flight surface control system for an aircraft as claimed in claim 12, in which the aircraft has three controllers B1, B2 an B3 in the second group of controllers arranged such that:

B1 control an aileron on one side of the aircraft, and the trimmable horizontal stabiliser;
B2 controls the aileron on the other side of the aircraft and one of the elevators; and
B3 controls the other elevator and a rudder actuator and a spoiler pair.

15. A flight surface control system for an aircraft as claimed in claim 1, in which each controller receives power from at least two electrical supplies.

16. A flight surface control system for an aircraft as claimed in claim 1, in which each controller has two power supplies, three controllers are provided in a group and three power supplies are provided, wherein the connections to the power supplies are permuted so that no two controllers in a group receive power from the same two supplies.

17. A flight surface control system for an aircraft as claimed in claim 1, wherein controllers in the second group whose functions are similar or equivalent to a controller in the first group have a different combination of power supply connections.

18. A flight surface control system for an aircraft as claimed in claim 1, in which there are at least three hydraulic systems for supplying pressurised fluid to hydraulic actuators for the control surfaces and wherein at least one of the following conditions is satisfied:

a) for a rudder having three actuators each actuator is on a different supply,
b) for a flight surface having two actuators, the actuators are on different supplies,
c) for pairs of flight surfaces on opposing sides of the aircraft, the flight surfaces receive hydraulic fluid from different supplies or different pairs of supplies.

19. A flight surface control system for an aircraft as claimed in claim 1, in which where a control surface is moved by two or more actuators, the controllers implement a force fight reduction algorithm.

20. An aircraft including a flight surface control system as claimed in claim 1.

* * * * *